(12) United States Patent
Puckett

(10) Patent No.: US 10,923,786 B2
(45) Date of Patent: Feb. 16, 2021

(54) HOUSING ASSEMBLY FOR ONE OR MORE ELECTRO CHEMICAL CELLS

(71) Applicant: Dana Automotive Systems Group, LLC, Maumee, OH (US)

(72) Inventor: Kelly D. Puckett, Paris, TN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 235 days.

(21) Appl. No.: 16/119,140

(22) Filed: Aug. 31, 2018

(65) Prior Publication Data

US 2020/0076023 A1 Mar. 5, 2020

(51) Int. Cl.
*H01M 10/6554* (2014.01)
*H01M 10/0525* (2010.01)
*H01M 2/10* (2006.01)

(52) U.S. Cl.
CPC ..... *H01M 10/6554* (2015.04); *H01M 2/1016* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 5,014,904 A | 5/1991 | Morton | |
| 5,161,092 A | 11/1992 | Smith et al. | |
| 5,424,913 A | 6/1995 | Swindler | |
| 5,583,377 A | 12/1996 | Higgins, III | |
| 5,850,104 A | 12/1998 | Avis | |
| 6,873,528 B2 | 3/2005 | Hulan et al. | |
| 2012/0312614 A1* | 12/2012 | Fujiwara | H01M 2/1077 180/68.5 |
| 2013/0111939 A1* | 5/2013 | Yan | B67D 99/00 62/282 |
| 2016/0372725 A1 | 12/2016 | Subramanian et al. | |
| 2017/0127567 A1 | 5/2017 | Besancon et al. | |
| 2020/0036066 A1* | 1/2020 | Cho | H01M 10/625 |

FOREIGN PATENT DOCUMENTS

WO   WO-2019078456 A1 * 4/2019 .......... H01M 2/1077

* cited by examiner

*Primary Examiner* — Wojciech Haske
(74) *Attorney, Agent, or Firm* — Marshall & Melhorn, LLC

(57) ABSTRACT

A housing assembly and a method of manufacturing the housing assembly. The housing assembly includes a trap portion and a heat transfer portion. A first plate member of the heat transfer portion has one or more first and second flanges having a length L1 and L2. A second plate member of the heat transfer portion has one or more first and second flanges having a length L3 and L4 that are larger than the lengths L1 and L2. At least a portion of the one or more first and second flanges of the first plate member are integrally connected to at least a portion of said one or more first and second flanges of said second plate member. Additionally, at least a portion of the one or more first and second flanges of the second plate member are overmoulded within the tray portion of the housing assembly.

13 Claims, 8 Drawing Sheets

SECTION A-A

SECTION A-A

SECTION A-A

SECTION A-A

SECTION A-A

SECTION A-A

HOUSING ASSEMBLY FOR ONE OR MORE ELECTRO CHEMICAL CELLS

FIELD OF THE DISCLOSURE

The present disclosure relates to a housing assembly for use with one or more electro-chemical cells.

BACKGROUND OF THE DISCLOSURE

Various battery cell housing assemblies are known in the art. Conventional battery cell housing assemblies have a complex structure that require a lot of interconnecting components in order to form a complete battery housing assembly. All of these additional components aid in increasing the overall weight of the battery cell housing assembly, increases the overall assembly time for the battery cell housing assembly, decreases manufacturing repeatability and increases the overall costs associated with a conventional battery cell housing assembly. Additionally, the complex structure of the conventional battery cell housing provides a multitude of locations for where a failure may occur resulting in a battery cell housing with an inadequate life span and poor durability.

It would therefore be advantageous to develop a housing assembly for one or more electro-chemical cells that is cost efficient, has a reduced overall weight, is easier to assemble, is easier to manufacture, has an improved manufacturing repeatability and has an improved overall life and durability.

SUMMARY OF THE DISCLOSURE

A housing assembly and a method of manufacturing the housing assembly. The housing assembly includes a tray portion and a heat transfer portion. A first plate member of the heat transfer portion has one or more first and second flanges having a length $L1$ and $L2$. A second plate member of the heat transfer portion has one or more first and second flanges having a length $L3$ and $L4$ that are larger than the lengths $L1$ and $L2$. At least a portion of the one or more first and second flanges of the first plate member are integrally connected to at least a portion of said one or more first and second flanges of said second plate member. Additionally, at least a portion of the one or more first and second flanges of the second plate member are overmoulded within the tray portion of the housing assembly.

The housing assembly according to the previous aspect of the disclosure, where the first plate member may further include an outwardly extending portion and the second plate member may further include an outwardly extending portion. The outwardly extending portion of the first plate member may extend from at least a portion an intermediate portion of said first plate member and the outwardly extending portion of the second plate member may extend from at least a portion of an intermediate portion of said second plate member. Additionally, the outwardly extending portion of the first plate member may be aligned with the outwardly extending portion of the second plate member defining one or more fluid passages.

According to any one of the previous aspects of the disclosure, the outwardly extending portion of the first plate member may have a height $\beta$. A portion of the one or more first flanges of the second plate member have one or more first clamping regions having a length $L5$ and said one or more second flanges of said second plate member have one or more second clamping regions having a length $L6$. The length $L5$ and $L6$ of the one or more first and second flanges of the second plate member may be defined by $L5 \geq \frac{1}{2}\beta$ and $L6 \geq \frac{1}{2}\beta$.

According to any one of the previous aspects of the disclosure, the outwardly extending portion of said first plate member has a height $\beta$. The one or more first flanges of the second plate member may have a length $L7$ extending from an axially outermost end of the one or more first flanges of the first plate member to an axially outermost end of the one or more first flanges of the second plate member. Additionally, the one or more second flanges of the second plate member have a length $L8$ extending from an axially outermost end of one or more second flanges of the first plate member to an axially outermost end of the one or more second flanges of the second plate member. The length $L7$ and $L8$ may be a defined by $L7 \leq 10 \times \beta$ and $L8 \leq 10 \times \beta$.

According to any one of the previous aspects of the disclosure, the tray portion of the housing assembly may include one or more axially extending portions and one or more radially extending portions. At least a portion of the one or more first and/or second flanges of the second plate member may be overmoulded within at least a portion of the one or more axially extending portions of tray portion of the housing assembly.

According to any one of the previous aspects of the disclosure, the housing assembly may further include one or more electro-chemical cells that are received and/or retained within at least a portion of the tray portion of the housing assembly.

According to any one of the previous aspects of the disclosure, the one or more electro-chemical cells may be one or more battery cells, one or more rechargeable battery cells, one or more lithium-ion battery cells.

According to any one of the previous aspects of the disclosure, the housing assembly may further include the use of one or more thermal expansion and contraction compensating members. The one or more thermal expansion and contraction compensating members may extend along at least a portion of the inner surface and the outer surface of an axially outermost end of the one or more first and second flanges of the second plate member. At least a portion of the one or more thermal expansion and contraction compensating members may be overmoulded within at least a portion of the tray portion of the housing assembly. The one or more thermal expansion and contraction compensating members allow for a pre-determined amount of thermal expansion and contraction between the one or more first and second plate members of the heat transfer portion and the tray portion of the housing assembly.

According to any one of the previous aspects of the disclosure, wherein the one or more thermal expansion and contraction compensating members are composed of a rubber composition, a polymeric composition, an elastomeric composition and/or a composite material.

According to any one of the previous aspects of the disclosure, the housing assembly may further include one or more first thermal expansion and contraction compensating members and one or more second thermal expansion and contraction compensating members. At least a portion of the one or more first thermal expansion and contraction compensating members may be integrally connected to at least a portion of the outer surface of the one or more first and second flanges of the second plate member. Additionally, at least a portion of the one or more second thermal expansion and contraction compensating members may be integrally connected to at least a portion of the inner surface of the one or more first and second flanges of the second plate member.

The one or more first and second thermal expansion and contraction compensating members allow for a pre-determined amount of thermal expansion and contraction between the one or more first and second plate members of the heat transfer portion and the tray portion of the housing assembly. At least a portion of the one or more first and second thermal expansion and contraction compensating members may be overmoulded within at least a portion of the tray portion of the housing assembly.

According to any one of the previous aspects of the disclosure, the one or more first and second thermal expansion and contraction compensating members may be composed of a rubber composition, a polymeric composition, an elastomeric composition and/or a composite material.

According to any one of the previous aspects of the disclosure, where the housing assembly may further include one or more apertures. The one or more apertures may extend from an inner surface to an outer surface of the one or more first and second flanges of the second plate member. At least a portion of the tray portion may be overmoulded over at least a portion of the one or more apertures in the one or more first and second flanges of the second plate member.

According to any one of the previous aspects of the disclosure, the tray portion may be made of a composite material such as but not limited to a composite vinyl ester, an injection moulded Nylon, a glass filled Nylon composite, a glass filled sheet moulding compound or a continuous fibre sheet material A method of manufacturing a housing assembly including providing a heat transfer portion having a first plate member and a second plate member. The first plate member may have one or more first flanges having a length L1, one or more second flanges having a length L2 and an outwardly extending portion having a height $\beta$ interposed between the one or more first and second flanges of the first plate member. The second plate member may have one or more first flanges having a length L3, one or more second flanges having a length L4 and an outwardly extending portion interposed between the first and second flanges of said second plate member. At least a portion of the one or more first and second flanges of the first plate member may be connected to at least a portion of the one or more first and second plate members of the second plate member of the heat transfer portion. Providing a first mould which includes one or more tray portion formation portions, one or more first mould clamping portions and one or more first plate member receiving portions having a size and shape to receive at least a portion of the outwardly extending portion of the first plate member. The method further includes providing a second mould with a second mould including one or more second mould clamping portions and one or more second plate member receiving portions having a size and shape to receive at least a portion of the outwardly extending portion of the second plate member. At least a portion of the heat transfer portion is clamped between the first and second moulds. Additionally, at least a portion of an end of the one or more first and second mould clamping portions may be in direct contact with at least a portion of the one or more first and second flanges of said first plate member and at least a portion of the one or more first and second flanges of the second plate member extend into the one or more tray portion formation portions of the first mould. An amount of moulding material is then inserted into said one or more tray portion formation portions of said first mould and over at least a portion of said one or more first and second flanges of said second plate member of said heat transfer portion.

The method according to the previous aspect of the disclosure, wherein one or more first mould clamping portions have a width $\alpha$ and said one or more second mould clamping portions have a width $\gamma$ and the widths may be defined by $\alpha \geq \frac{1}{2}\beta$ and $\gamma \geq \frac{1}{2}\beta$.

According to any one of the previous aspects of the disclosure, the one or more first flanges of the second plate member may have a length L7 extending from an axially outermost end of the one or more first flanges of the first plate member to an axially outermost end of the one or more first flanges of second plate member. Additionally, the one or more second flanges of the second plate member may have a length L8 extending from an axially outermost end of the one or more second flanges of the first plate member to an axially outermost end of the one or more second flanges of the second plate member. The lengths L7 and L7 may be defined by $L7 \leq 10 \times \beta$ and $L8 \leq 10 \times \beta$.

According to any one of the previous aspects of the disclosure, the method may further include the steps of providing one or more thermal expansion and contraction compensating members. At least a portion of the one or more thermal expansion and contraction compensating members may be connected to at least a portion of an inner surface and an outer surface of the one or more first and second flanges of the second plate member along an axially outermost end of the one or more first and second flanges of the second plate member. Additionally, at least a portion of the tray portion may be overmoulded over at least a portion of the one or more thermal expansion and contraction compensating members and the one or more first and second flanges of the second plate member of the heat transfer portion.

According to any one of the previous aspects of the disclosure, the method may further include the steps of providing one or more first thermal expansion and contraction compensating members and one or more second thermal expansion and contraction compensating members. At least a portion of the one or more first thermal expansion and contraction compensating members may be connected to at least a portion of an outer surface of the one or more first and second flanges of second plate member. Additionally, at least a portion of the one or more second thermal expansion and contraction compensating members may be connected to at least a portion of an inner surface of the one or more first and second flanges of the second plate member. Once connected to the one or more first and second flanges of the second plate member, at least a portion of the tray portion may be overmoulded over at least a portion of the one or more first and second thermal expansion and contraction compensating members and the one or more first and second flanges of the second plate member of heat transfer portion.

According to any one of the previous aspects of the disclosure, the method may further include the steps of forming one or more apertures extending from an inner surface to an outer surface of the one or more first and second flanges of the second plate member of the heat transfer portion. Once the one or more apertures have been formed in the one or more first and second flanges of the second plate member, at least a portion of the tray portion may be overmoulded over at least a portion of tray one or more apertures and tray one or more first and second flanges of tray second plate member.

According to any one of the previous aspects of the disclosure, the method may further include the steps of providing one or more electro-chemical cells. Once the housing assembly has been formed and removed from the first and second mould, at least a portion of the one or more electro-chemical cells may be inserted into at least a portion of the tray portion formed.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the housing assembly disclosed herein may be used in automotive, off-road vehicle, all-terrain vehicle, construction, structural, marine, aerospace, locomotive, military, machinery, robotic and/or consumer product applications. Additionally, as a non-limiting example, the housing assembly disclosed herein may also be used in passenger vehicle, electric vehicle, hybrid vehicle, commercial vehicle, autonomous vehicles, semi-autonomous vehicles and/or heavy vehicle applications.

Figure 1:
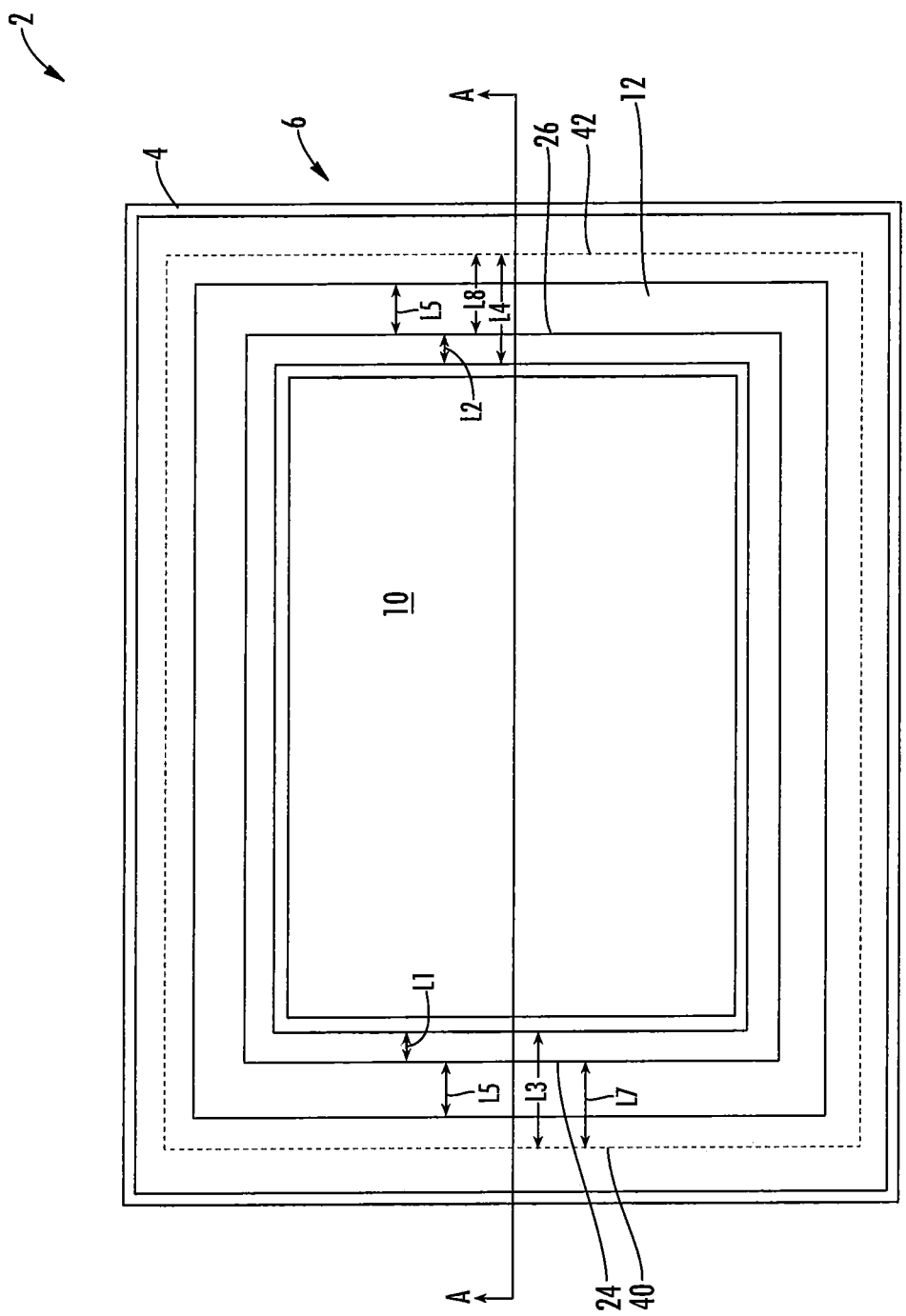
FIG. 1 is a schematic top-plan view of a housing assembly having a tray portion and a heat transfer portion and without one or more electro-chemical cells.
Figure 2:
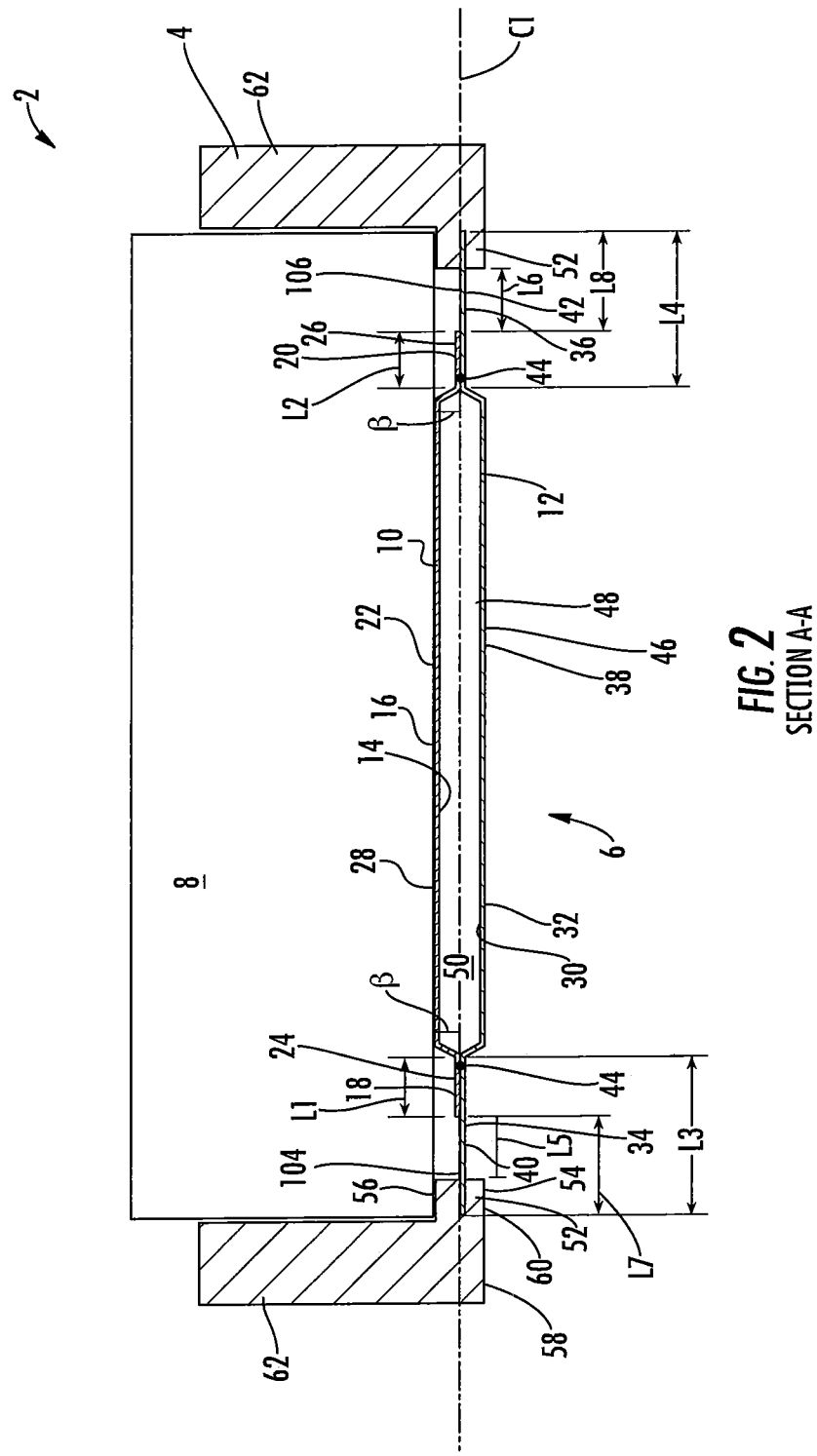
FIG. 2 is a schematic cross-sectional side-view of the housing assembly in FIG. 1 along the line A-A illustrated having one or more electro-chemical cells disposed therein.

FIGS. 1-3A provide a schematic illustration of a housing assembly 2 according to an embodiment of the disclosure. As illustrated in FIGS. 1 and 2 of the disclosure, the housing assembly 2 includes a tray portion 4 and a heat transfer portion 6. The housing assembly 2 may be of a size and shape to received and/or retain at least a portion of one or more electro-chemical cells 8 therein. The one or more electro-chemical cells 8 disposed within at least a portion of the tray portion 4 of the housing assembly 2 may be utilized in order to provide power to one or more components of a vehicle and the heat transfer portion 6 may be utilized in order to ensure that the one or more electro-chemical cells 8 are maintained at a substantially steady or constant temperature at all times when in operation. This aids in improving the overall battery life, durability and functionality of the one or more electro-chemical cells 8. In accordance with the embodiment illustrated in FIG. 1 and as a non-limiting example, the housing assembly 2 is substantially rectangular in shape, however it is to be understood that the housing assembly 2 may take any shape needed to receive and/or retain at least a portion of the one or more electro-chemical cells 8. Additionally, it is within the scope of this disclosure and as a non-limiting example that the one or more electro-chemical cells 8 may be one or more battery cells, one or more rechargeable battery cells, one or more lithium-ion battery cells and/or any other type of device that is capable of generating an amount of electrical energy from one or more chemical reactions.

The heat transfer portion 6 of the housing assembly 2 of the housing assembly 2 may include a first plate member 10 that is integrally connected to at least a portion of a second plate member 12. It is to be understood that the heat transfer portion 6 of the housing assembly 2 may be a cold plate assembly. As best seen in FIG. 2 of the disclosure and as a non-limiting example, the first plate member 10 has an inner surface 14, an outer surface 16, a first end portion 18, a second end portion 20 and an intermediate portion 22 interposed between the first and second end portions 18 and 20 of the first plate member 10. At least a portion of the first end portion 18 of the first plate member 10 of the heat transfer portion 6 may include one or more first flanges 24 and the second end portion 20 of the first plate member 10 may include one or more second flanges 26. The one or more first and the second flanges 24 and 26 of the first plate member 10 may extend in a substantially horizontal manner and parallel to a centerline C1 of the heat transfer portion 6. It is within the scope of this disclosure and as a non-limiting example that the one or more first and second flanges 24 and 26 may be a single continuous flange extending along the outer periphery of the first plate member 10 or a plurality of flanges extending along the outer periphery of the first plate member 10 of the heat transfer portion 6. As a non-limiting example, the first plate member 10 of the heat transfer portion 6 may be made of aluminium or an aluminium alloy.

At least a portion of the intermediate portion 22 of the first plate member 10 of the heat transfer portion 6 may include an outwardly extending portion 28 having a height β. In accordance with the embodiment illustrated in FIG. 2 of the disclosure and as a non-limiting example, the outwardly extending portion 28 of the first plate member 10 may extend radially outward from the centerline C1 of the heat transfer portion 6. Additionally, in accordance with the embodiment illustrated in FIG. 2 and as a non-limiting example, at least a portion of the outwardly extending portion 28 of the first plate member 10 extends away from the second plate member 12 of the heat transfer portion 6. It is therefore to be understood that the one or more first and second flanges 24 and 26 of the first plate member 10 are disposed on axially opposing sides of the outwardly extending portion 28 of the first plate member 10.

Disposed radially inward from at least a portion of the first plate member 10 is the second plate member 12 of the heat transfer portion 6. As best seen in FIG. 2 and as a non-limiting example, the second plate member 12 has an inner surface 30, an outer surface 32, a first end portion 34, a second end portion 36 and an intermediate portion 38 interposed between the first and second end portions 34 and 36 of the second plate member 12. At least a portion of the first end portion 34 of the second plate member 12 of the heat transfer portion 6 may include a one or more first flanges 40 and the second end portion 36 of the second plate member 12 may include one or more second flanges 42. The one or more first and the second flanges 40 and 42 of the second plate member 12 may extend in a substantially horizontal manner and parallel to the centerline C1 of the heat transfer portion 6. It is within the scope of this disclosure and as a non-limiting example that the one or more first and second flanges 40 and 42 may be a single continuous flange extending along the outer periphery of the second plate member 12 or a plurality of flanges extending along the outer periphery of the second plate member 12 of the heat transfer portion 6. As a non-limiting example, the second plate member 12 of the heat transfer portion 6 may be made of aluminium or an aluminium alloy.

When assembled, at least a portion of the one or more first flanges 24 of the first plate member 10 are in direct contact with and are integrally connected to at least a portion of the one or more first flanges 40 of the second plate member 12 of the heat transfer portion 6. Additionally, when assembled, at least a portion of the one or more second flanges 26 of the first plate member 10 are in direct contact with and are integrally connected to at least a portion of one or more the second flanges 42 of the second plate member 12 of the heat transfer portion 6. In accordance with the embodiment illustrated in FIG. 2 and as a non-limiting example, at least a portion of the one or more first and second flanges 24 and 26 of the first plate member 10 may be integrally connected to at least a portion of the one or more first and second flange portions 40 and 42 of the second plate member 12 by using one or more joining processes 44. It is within the scope of this disclosure and as a non-limiting example that the one or more joining processes 44 may be one or more energy welds, one or more laser welds, one or more welds, one or more brazing processes, one or more soldering processes, one or more adhesives and/or any other type of welding or joining process for integrally connecting one plate member to another.

In accordance with the embodiment illustrated in FIG. 2 of the disclosure and as a non-limiting example, the one or more first flanges 24 of the first plate member 10 have a length L1 and the one or more second flanges 26 of the first plate member 10 have a length L2. As a non-limiting example, the length L1 of the one or more first flanges 24 of the first plate member 10 may be substantially equal to the length L2 of the second flange 26 of the first plate member 10. Additionally, in accordance with the embodiment illustrated in FIG. 2 and as a non-limiting example, the one or more first flanges 40 of the second plate member 12 have a length L3 and the one or more second flanges 42 of the second plate member 12 have a length L4. As a non-limiting example, the length L3 of the one or more first flanges 40 of the second plate member 12 may be substantially equal to the length L4 of the one or more second flanges 42 of the second plate member 12. According to the embodiment illustrated in FIG. 2 and as a non-limiting example, the lengths L1 and L1 of the one or more first and second flange 24 and 26 of the first plate member 10 may be shorter than the lengths L3 and L4 of the one or more first and second flanges 40 and 42 of the second plate member 12.

At least a portion of the intermediate portion 38 of the second plate member 12 of the heat transfer portion 6 may include an outwardly extending portion 46. In accordance with the embodiment illustrated in FIG. 2 of the disclosure and as a non-limiting example, the outwardly extending portion 46 of the second plate member 12 may extend radially outward from the centerline C1 of the heat transfer portion 6. Additionally, in accordance with the embodiment illustrated in FIG. 2 and as a non-limiting example, at least a portion of the outwardly extending portion 46 of the second plate member 12 extends away from the first plate member 10 of the heat transfer portion 6. It is therefore to be understood that the one or more first and second flanges 40 and 42 of the second plate member 12 are disposed on axially opposing sides of the outwardly extending portion 46 of the second plate member 12.

When the heat transfer portion 6 of the housing assembly 2 is assembled, the outwardly extending portion 28 of the first plate member 10 is aligned with the outwardly extending portion 46 of the second plate member 12 defining one or more fluid passages 48. It is therefore to be understood that the one or more joining processes 44 may be utilized in order to ensure a fluid tight connection between the first and second plate members 10 and 12 of the heat transfer portion 6 of the housing assembly 2. The one or more fluid passages 48 of the heat transfer portion 6 may be of a size and shape to receive and/or direct the flow of an amount of heat transfer fluid 50 disposed within or flow through the one or more fluid passages 48. The heat transfer fluid 50 disposed within the one or more fluid passages 48 may be utilized in order to transfer an amount of heat from the one or more electro-chemical cells 8 or to the one or more electro-chemical cells 8 as needed in order to ensure that the one or more electro-chemical cells 8 are maintained at a substantially constant temperature. It is within the scope of this disclosure and as a non-limiting example that the heat transfer fluid 50 may enclosed and retained within the one or more fluid passages 48 or the heat transfer fluid 50 may flow through the one or more fluid passages 48 from an inlet (not shown) to an outlet (not shown) that are in fluid communication with the one or more fluid passages 48.

Disposed axially outboard from and integrally connected to at least a portion of the heat transfer portion 6 is the tray portion 4 of the housing assembly 2. As best seen in FIG. 2 of the disclosure and as a non-limiting example, the tray portion 4 includes one or more axially extending portions 52 having an inner surface 54, an outer surface 56, a first end portion 58 and a second end portion 60. In accordance with the embodiment illustrated in FIG. 2 and as a non-limiting example, at least a portion of the one or more first and second flanges 40 and 42 are received and retained within at least a portion of the second end portion 60 of the one or more axially extending portions 52 of the tray portion 4. As will be discussed in more detail herein, at least a portion of the one or more first and second flanges 40 and 42 of the second plate 12 of the heat transfer portion 6 maybe integrally formed within and bonded to at least a portion of the one or more axially extending portions 52 of the tray portion 4 of the housing assembly 2. It is therefore to be understood that the tray portion 4 of the housing assembly 2 may be moulded over at least a portion of the one or more first and second flanges 40 and 42 of the second plate member 12 as part of an overmoulding process.

Extending outward from at least a portion of the outer surface 56 of the one or more axially extending portions 52 of the tray portion 4 of the housing assembly 2 is one or more radially extending portions 62. As best seen in FIG. 2 of the disclosure and as a non-limiting example, at least a portion of the one or more radially extending portions 62 of the tray portion 4 extends outward away from the heat transfer portion 6 of the housing assembly 2 and surrounds at least a portion of the one or more electro-chemical cells 8. It is within the scope of this disclosure and as a non-limiting example that the tray portion 4 of the housing assembly 2 may be made of a composite material such as but not limited to a composite vinyl ester, an injection moulded Nylon, a glass filled Nylon composite, a glass filled sheet moulding compound or a continuous fibre sheet material. By making the tray portion 4 of the housing assembly 2 out of a composite material, the overall mass and costs associated with the assembly and manufacturing of the housing assembly 2 can be reduced while at the same time retaining the desired strength, durability and heat transfer properties needed.

Figure 3:
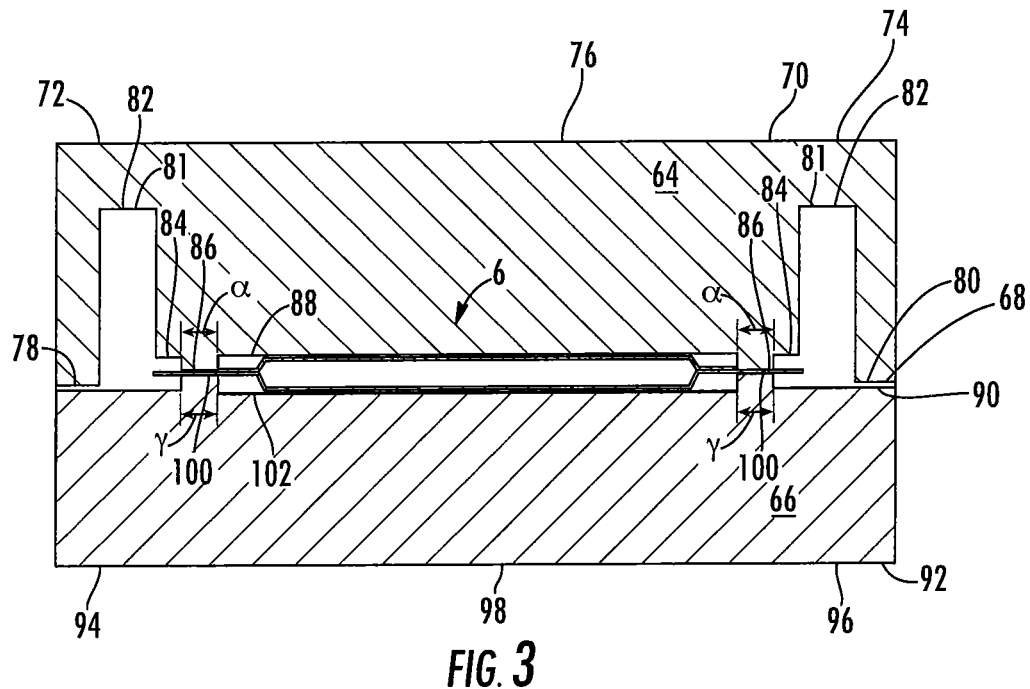
FIG. 3 is a schematic cross-sectional side-view illustrating a moulding apparatus according to an embodiment of the disclosure that is utilized in order to form the housing assembly illustrated in FIGS. 1 and 2 of the disclosure.

In order to assemble the tray portion 4 to the heat transfer portion 6 of the housing assembly 2, a first mould 64 and a second mould 66 of a moulding assembly 63 are used. As best seen in FIG. 3 of the disclosure and as a non-limiting example, the first mould 64 has a first surface 68 and a second surface 70, a first end portion 72, a second end portion 74 and an intermediate portion 76 interposed between the first and second end portions 72 and 74 of the first mould 64. It is within the scope of this disclosure and as a non-limiting example that the first and/or second mould 64 and/or 66 may be made of a steel alloy, a tool steel composition, an aluminium alloy, a stainless steel alloy and/or any other type of metallic material.

Figure 3A:
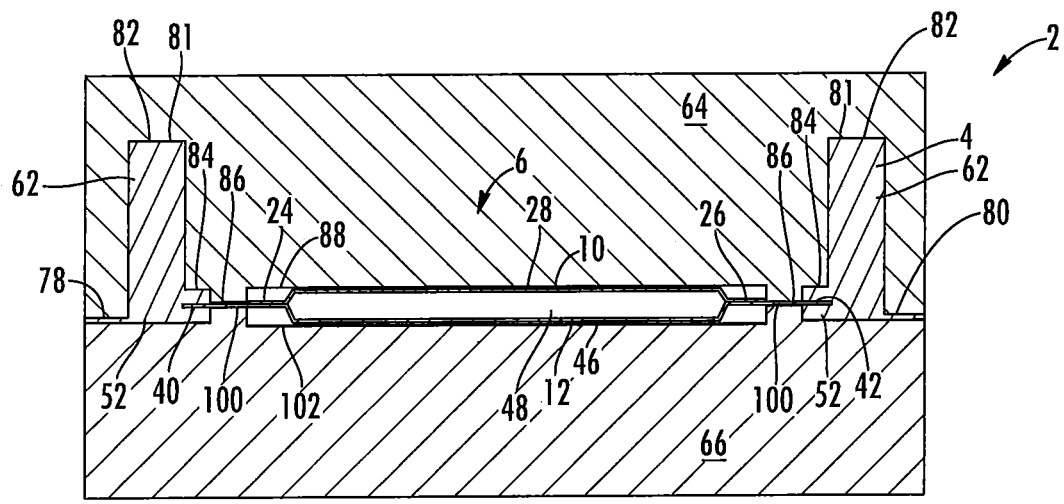
FIG. 3A is a schematic cross-sectional side-view illustrating a moulding apparatus of FIG. 3 with the housing assembly illustrated in FIGS. 1 and 2 formed therein.

Extending inward into the first mould 64 from at least a portion of the first end portion 72 of the first surface 68 is a first inlet portion 78. Additionally, extending inward into the first mould 64 from at least a portion of the second end portion 74 of the first surface 68 is a second inlet portion 80. As best seen in FIGS. 3 and 3A of the disclosure and as a non-limiting example, when the first and second moulds 64 and 66 are clamped down on the heat transfer portion 6 of the housing assembly 2, the first and second inlet portions 78 and 80 provide a gap between the first mould 64 and the second mould 66. This allows for the passage of an amount of moulding material into the first and/or second moulds 64 and/or 66 needed in order to form the tray portion 4 of the housing assembly 2. It is to be understood that the moulding material is the material that makes up the tray portion 4 of the housing assembly 2 when moulded. As a result, it is within the scope of this disclosure and as a non-limiting example that the moulding material may be a composite material such as but not limited to a composite vinyl ester, an injection moulded Nylon, a glass filled Nylon composite, a glass filled sheet moulding compound or a continuous fibre sheet material.

Disposed directly adjacent to and inboard from the first and second inlet portions 78 and 80 of the first mould 64 one or more tray portion formation portions 81. As best seen in FIGS. 3 and 3A of the disclosure and as a non-limiting example the one or more tray portion formation portions 81 of the first mould 64 may include one or more radially extending portion formation portions 82 and one or more axially extending portion formation portions 84. The one or more radially extending portion formation portions 82 and one or more axially extending portion formation portions 84 extend inward from at least a portion of the first surface 68 and into the first mould 64. It is to be understood that the one or more radially extending portion formation portions 82 and the one or more axially extending portion formation portions 84 are of a size and shape that is complementary to the one or more radially extending portions 62 and the one or more axially extending portions 60 of the tray portion 4 of the housing assembly 2. As a result, when an amount of moulding material is inserted into the first and/or second moulds 64 and/or 66 through the inlet portions 78 and 80, the moulding material will fill the one or more radially extending portion formation portions 82 and the one or more axially extending portion formation portions 84 of the first mould 64 thereby forming the one or more radially extending portions 62 and the one or more axially extending portions 60 of the tray portion 4.

Axially inboard from and directly adjacent to an end of the one or more axially extending portion formation portions 84, opposite the first and/or second inlet portions 78 and 80, is one or more first mould clamping portions 86 having a width α. As best seen in FIGS. 3 and 3A of the disclosure and as a non-limiting example, the one or more first mould clamping portions 86 extend toward from the first surface 68 of the first mould 64 toward the second mould 66 of the moulding assembly 63. During the moulding process, at least a portion of the one or more first mould clamping portions 86 are in direct contact with at least a portion of an end of the one or more first and second flanges 24 and 26 of the first plate member 10 and are in direct contact with at least a portion of the one or more first and second flanges 40 and 42 of the second plate member 12 of the heat transfer portion 6. By ensuring that the one or more first mould clamping portions 86 are in direct contact with at least a portion of the one or more first flanges 24 and 26 of the first plate and at least a portion of the one or more first mould clamping portions 86 are in direct contact with at least a portion of the one or more first and second flanges 40 and 42 of the second plate members 12 of the heat transfer portion 6, it aids in ensuring that the heat transfer portion 6 does not move within the mound during the moulding proves.

In accordance with the embodiment illustrated in FIGS. 3 and 3A of the disclosure and as a non-limiting example, the entire structure of the one or more first mould clamping portions 86 are disposed axially outboard from the one or more first and second flanges 24 and 26 of the first plate member 10. As a result, in accordance with the embodiment illustrated in FIG. 3A and as a non-limiting example, one end of the one or more first mould clamping portions 86 are in direct contact with an end of the one or more axially extending portions 52 of the tray portion 4. Additionally, in accordance with the embodiment illustrated in FIG. 3A and as a non-limiting example, and an end of the one or more first mould clamping portions 86, opposite the one or more axially extending portions 52, are in direct contact with the one or more first and second flange portions 24 and 26 of the first plate member 10.

At least a portion of the intermediate portion 76 of the first surface 68 of the first mould 64 includes a first plate member receiving portion 88. As best seen in FIGS. 3 and 3A of the disclosure and as a non-limiting example, the first plate member receiving portion 88 extends inward into the first mould 64 away from the second mold 66 of the moulding assembly 63. Additionally, as best seen in FIGS. 3 and 3A and as a non-limiting example, the first plate member receiving portion 88 of the first mould 64 may be interposed between the one or more first mould clamping portions 86 of the first mould 64. It is within the scope of this disclosure and as a non-limiting example that the depth of the first plate member receiving portion 88 may be substantially equal to or slightly greater than the height β of the of the outwardly extending portion 28 of the first plate member 10. This will aid in ensuring that the heat transfer portion 6 of the housing assembly is held securely in place during the moulding process. Additionally, this will aid ensuring that the heat transfer portion 6 is not deformed in any way as a result of the moulding process.

Disposed directly adjacent to and radially inboard from at least a portion of the first mould 64 is the second mould 66 of the moulding assembly 63. As best seen in FIG. 3 of the disclosure and as a non-limiting example, the second mould 66 has a first side 90, a second side 92, a first end portion 94, a second end portion 96 and an intermediate portion 98 interposed between the first and second end portions 94 and 96 of the second mould 66. As best seen in FIGS. 3 and 3A of the disclosure and as a non-limiting example, the second mould 66 includes one or more second mould clamping portions 100 having a width γ. The one or more second mould clamping portions 100 extend outward from at least a portion of the first surface 90 of the second mould 66 toward the first mould 64 of the moulding assembly 63. In accordance with the embodiment illustrated in FIGS. 3 and 3A and as a non-limiting example, the one or more second mould clamping portions 100 of the second mould 66 are aligned with the one or more first mould clamping portions 86 of the first mould 64. It is within the scope of this disclosure and as a non-limiting example that the width γ of the one or more second mould clamping portions 100 of the second mould 66 may be substantially equal to the width α of the one or more first mould clamping portions 86 of the first mould 64.

During the moulding process, at least a portion of the one or more second mould clamping portions 100 are in direct contact with at least a portion of the one or more first and second flanges 40 and 42 of the second plate member 12 of the heat transfer portion 6. It is therefore to be understood that during the moulding process, the heat transfer portion 6 of the housing assembly 2 is securely held in place within the moulding assembly 63 by the one or more first and second mould clamping portions 86 and 100 of the first and second moulds 64 and 66 applying an amount of force onto the one or more first and/or second flanges 24, 26, 40 and/or 42 of the first and/or second plate members 10 and/or 12 of the heat transfer portion 6. Additionally, it is to be understood that the one or more first and second mould clamping portions 86 and 100 of the first and second moulds 64 and 66 of the moulding assembly 63 aid in forming at least a portion of the tray portion 4 while at the same time preventing the migration of an amount of moulding material from migrating beyond a pre-determined distance along the one or more first and second flanges 40 and 42 of the second plate member 12. This aids in ensuring only a pre-determined amount of the one or more first and second flanges 40 and 42 of the second plate member 12 are moulded within the tray portion 4 of the housing assembly 2.

At least a portion of the intermediate portion 98 of the first side 90 of the second mould 66 includes a second plate member receiving portion 102. As best seen in FIGS. 3 and 3A and as a non-limiting example, the second plate member receiving portion 102 extends inward into the second mould 66 away from the first mould 64 of the moulding assembly 63. Additionally, as best seen in FIGS. 3 and 3A of the disclosure and as a non-limiting example, the second plate member receiving portion 102 of the second mould 66 may be interposed between the one or more second mould clamping portions 100 of the second mould 66. It is within the scope of this disclosure and as a non-limiting example that the depth of the second plate member receiving portion 102 may be substantially greater than or slightly greater than the height of the outwardly extending portion 46 of the second plate member 12. This will aid in ensuring that the heat transfer portion 6 of the housing assembly is held securely in place during the moulding process. Additionally, this will aid ensuring that the heat transfer portion 6 is not deformed in any way as a result of the moulding process.

As best seen in FIG. 2 of the disclosure and as a non-limiting example, the one or more first and second flanges 40 and 42 of the first plate member 10 include one or more first clamping regions 104 having a length L5 and one or more second clamping regions 106 having a length L6. The one or more first and second clamping regions 104 and 106 of the one or more first and second flanges 40 and 42 of the second plate member 12 are interposed between an axially outermost end of the one or more first and second flanges 24 and 26 of the first plate member 10 and an axially innermost end of the one or more axially extending portions 52 of the tray portion 4. It is within the scope of this disclosure and as a non-limiting example that the one or more first and second clamping regions 104 and 106 of the second plate member 12 may be a single continuous clamping region or a plurality of clamping regions. As a non-limiting example, the Length L5 of the one or more first clamping regions 104 may be substantially equal to the length L6 of the one or more second clamping regions 106 of the second plate member 12.

According to an embodiment of the disclosure and as a non-limiting example, the width α and γ of the one or more first and second mould clamping portions 86 and 100 of the first and second moulds 64 and 66 may be function of the height β of the outwardly extending portion 28 of the first plate member 10 of the heat transfer portion 6. It is within the scope of this disclosure and as a non-limiting example that the width α and γ of the one or more first and second mould clamping portions 86 and 100 may be greater than or equal to one-half the height β of the outwardly extending portion 28 of the first plate member 10 as provided in the following expressions.

$$\alpha \geq \tfrac{1}{2}\beta$$

$$\gamma \geq \tfrac{1}{2}\beta$$

By providing the one or more first and second mould clamping portions 86 and 100 with a width α and γ that is greater than or equal to one-half the height β of the outwardly extending portion 28, it aids in ensuring that the one or more first and second mould clamping portions 86 and 100 have sufficient surface area contact with the one or more first and second flanges 24, 26, 40 and 42 of the first and second plate members 10 and 12. Additionally, this aids in ensuring that an overall length L5 and L6 of the one or more first and second clamping regions 104 and 106 of the one or more first and second flanges 40 and 42 of the second plate member 12 connecting the heat transfer portion 6 of the tray portion 4 of the housing assembly 2 are enough to provide the heat transfer portion 6 with the strength needed to support the weight of at least a portion of the one or more electro-chemical cells 8. Furthermore, this aids in ensuring that the overall length L5 and L6 of the one or more first and second clamping regions 104 and 106 of the one or more first and second flanges 40 and 42 of the second plate member 12 is enough to reduce and/or eliminate any failures that may occur to the one or more first and second clamping regions 104 and 106 resulting from thermal stresses within the housing assembly 2 when in operation. As a result, if the widths α and γ are less than one-half the height β of the outwardly extending portion 28 of the first plate member 10, the one or more first and second mould clamping portions 86 and 100 may create an indentation in the first and/or second flanges 40 and/or 42 of the second plate member 12. These indentations create an unwanted and undesired fracture or failure location that greatly reduce the amount of mass and thermal stresses the heat transfer portion 6 can handle before failing thereby reducing the overall life and durability of the heat transfer portion 6. It is therefore to be understood that the relationship between the width α and γ of the one or more first and second mould clamping portions 86 and 100 and the height β of the outwardly extending portion 28 of the first plate member 10 is critical and necessary in order to ensure that the housing assembly 2 has the improved life, strength, durability and weight desired while being cost efficient and easily manufactural.

Based on the foregoing, it is therefore to be understood that the lengths L5 and L6 of the one or more first and second flanges 40 and 42 of the second plate member 12 may be a function of the height β of the outwardly extending portion 28 of the first plate member 10 of the heat transfer portion 6. It is therefore within the scope of this disclosure and as a non-limiting example that the lengths L5 and L6 of the one or more first and second flanges 40 and 42 may be greater than or equal to one-half the height β of the outwardly extending portion 28 of the first plate member 10 as provided in the following expressions.

$$L5 \geq \tfrac{1}{2}\beta$$

$$L6 \geq \tfrac{1}{2}\beta$$

By providing the one or more first and second flanges 40 and 42 of the second plate member 12 with a length L5 and L6 that is greater than or equal to one-half the height β of the outwardly extending portion 28, it aids in ensuring that the one or more first and second mould clamping portions 86 and 100 have sufficient surface area contact with the one or more first and second flanges 24, 26, 40 and 42 of the first and second plate members 10 and 12. Additionally, this aids in ensuring that the overall length L5 and L6 of the one or more first and second clamping regions 104 and 106 of the one or more first and second flanges 40 and 42 of the second plate member 12 is enough to provide the heat transfer portion 6 with the strength needed to support the weight of at least a portion of the one or more electro-chemical cells 8. Furthermore, this aids in ensuring that the overall length L5 and L6 of the second plate member 12 is enough to reduce and/or eliminate any failures that may occur to the one or more first and second clamping regions 104 and 106 resulting from thermal stresses within the housing assembly 2 when in operation. As a result, if the lengths L5 and L6 are less than one-half the height β of the outwardly extending portion 28 of the first plate member 10, the one or more first and second mould clamping portions 86 and 100 may create an indentation in the first and/or second flanges 40 and/or 42 of the second plate member 12. These indentations create an unwanted and undesired fracture or failure location that greatly reduce the amount of mass and thermal stresses the heat transfer portion 6 can handle before failing thereby reducing the overall life and durability of the heat transfer portion 6. It is therefore to be understood that the relationship between the length L5 and L6 the one or more first and second clamping regions 104 and 106 of the second plate member 12 and the height β of the outwardly extending portion 28 of the first plate member 10 is critical and necessary in order to ensure that the housing assembly 2 has the improved life, strength, durability and weight desired while being cost efficient and easily manufactural.

In accordance with an embodiment of the disclosure and as a non-limiting example, the one or more first and second flanges 40 and 42 of the second plate member 12 may extend a length L7 and L8 from the axially outermost end of the one or more first and second flanges 24 and 26 of the first plate member 10. According to an embodiment of the disclosure and as a non-limiting example, the length L7 and L8 of the portions of the one or more first and second flanges 40 and 42 of the second plate member 12 extending beyond the one or more first and second flanges 24 and 26 of the first plate member 10 may be a function of the height β of the outwardly extending portion 28 of the first plate member 10 of the heat transfer portion 6. It is within the scope of this disclosure and as a non-limiting example that the length L7 and L8 of the one or more first and second flanges 40 and 42 of the second plate member 12 may be less than or equal to ten times the height β of the outwardly extending portion 28 of the first plate member 10 as provided in the following expressions.

$$L7 \leq 10 \times \beta$$

$$L8 \leq 10 \times \beta$$

By providing the one or more first and second flanges 40 and 42 with a length L7 and L8 that is less than or equal to ten times the height β of the outwardly extending portion 28 of the first plate member 10, it aids in ensuring that the one or more first and second flanges 40 and 42 of the second plate member 12 have sufficient surface area contact with the tray portion 4 of the housing assembly 2. This aids in ensuring that there the bond between the tray portion 4 and the heat transfer portion 6 of the housing assembly 2 is strong enough in order to improve the overall life and durability of the housing assembly 2. If the length L7 and L8 of the one or more first and second flanges 40 and 42 of the second plate member 12 are larger than ten times height β of the outwardly extending portion 28 of the first plate member 10, it adds additional material to the housing assembly 2 thereby adding an undesirable amount of weight to the housing assembly 2. Additionally, if the length L7 and L8 of the one or more first and second flanges 40 and 42 of the second plate member 12 are larger than ten times height β of the outwardly extending portion 28 of the first plate member 10, the forces imposed onto the one or more first and second flanges 40 and 42 tend to bend one or more first and second flanges 40 and 4 radially inboard or radially outboard from the centerline C1 of the heat transfer portion 6. This either results in a failed moulding or a housing assembly 2 that will fail prematurely. It is therefore to be understood that the relationship between the length L7 and L8 of the one or more first and second flanges 40 and 42 of the second plat member and the height β of the outwardly extending portion 28 of the first plate member 10 is critical and necessary in order to ensure that the housing assembly 2 has the improved life, strength, durability and weight desired while being cost efficient and easily manufactural.

Figure 4:
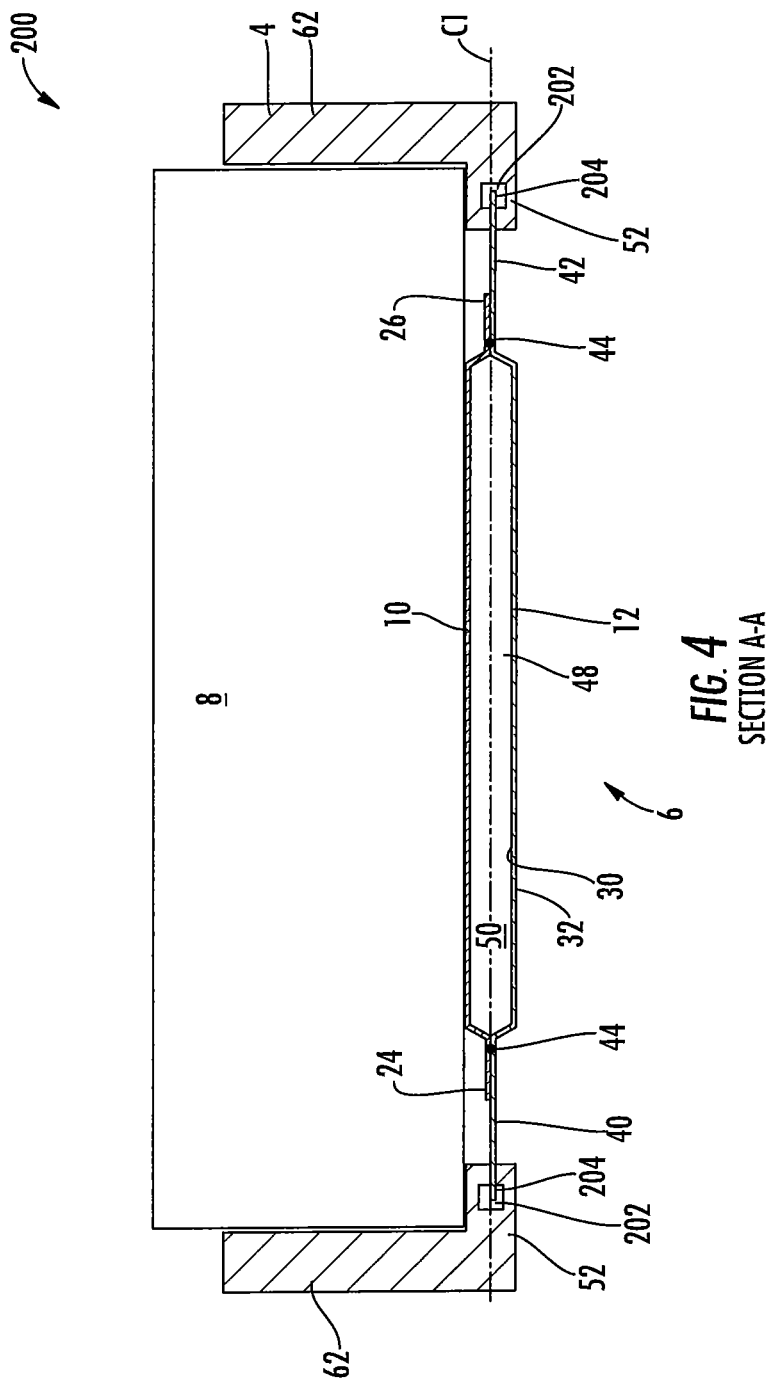
FIG. 4 is a schematic cross-sectional side-view of the housing assembly illustrated in FIGS. 1 and 3 according to an alternative embodiment of the disclosure.

FIG. 4 is a schematic cross-sectional side-view of a housing assembly 200 according to an alternative embodiment of the disclosure. The housing assembly 200 illustrated in FIG. 4 is the same as the housing assembly 2 illustrated in FIGS. 1-3A, except where specifically noted below. As illustrated in FIG. 4 of the disclosure and as a non-limiting example, the housing assembly 200 includes the use of one or more thermal expansion and contraction compensating members 202. The one or more thermal expansion and contraction compensating members 202 act as a mechanical isolator allowing a pre-determined amount of thermal expansion and contraction of the first and second plate members 10 and 12 relative to the tray portion 4 without resulting in a failure and/or creating one or more fractures within the structure of the housing assembly 200. This provides a more robust housing assembly 200 which in turn aids in improving the overall life and durability of the housing assembly 200. It is within the scope of this disclosure and as a non-limiting example that the one or more thermal expansion and contraction compensating members 202 may be composed of a rubber composition, a polymeric composition, an elastomeric composition and/or a composite material.

At least a portion of the one or more thermal expansion and contraction compensating members 202 of the housing assembly 200 extend along at least a portion of the inner surface 30 and the outer surface 32 of the axially outermost end of the one or more first and second flanges 40 and 42 of the second plate member 12. It is within the scope of this disclosure and as a non-limiting example that the one or more thermal expansion and contraction compensating members 202 may be a single continuous member or a plurality of thermal compensating members disposed along the axially outermost end of the one or more first and second flanges 40 and 42 of the second plate 12 of the heat transfer portion 6 of the housing assembly 200.

According to an embodiment of the disclosure and as a non-limiting example the one or more thermal expansion and contraction compensating members 202 may be integrally formed as part of the axially outermost end of the one or more first and second flanges 40 and 42 of the second plate member 12. As a result, it is to be understood that the one or more thermal expansion and contraction compensating members 202 may be vulcanized, adhered using one or more adhesives or epoxies or chemically welded to the axially outermost periphery of the one or more first and second flanges 40 and 42 of the second plate member 12. In accordance with an alternative embodiment of the disclosure and as a non-limiting example, the one or more thermal expansion and contraction compensating members 202 may include one or more grooves 204 that extends inward into the one or more thermal expansion and contraction compensating members 202. The one or more grooves 204 within the one or more thermal expansion and contraction compensating members 202 may be of a size and shape needed in order to receive and/or retain at least a portion of the one or more first and second flanges 40 and 42 of the second plate 12.

In order to assemble the housing assembly 200, the one or more thermal expansion and contraction compensating members 202 are attached to the axially outermost periphery of the one or more first and second flanges 40 and 42 of the second plate member 12 prior to inserting the heat transfer portion 6 into the mould assembly 63. Once the heat transfer portion 6 and the one or more thermal expansion and contraction compensating members 202 have been secured within the moulding assembly 63, an amount of moulding material will be flown into the moulding assembly 63 thereby forming the tray portion 4 of the housing assembly 200 around the one or more thermal expansion and contraction compensating members 202 and the one or more first and second flanges 40 and 42 of the second plate member 12. It is therefore to be understood that the one or more thermal expansion and contraction compensating members 202 and the one or more first and second flanges 40 and 42 of the second plate member 12 may be moulded within the tray portion 4 as part of an overmoulding process.

Figure 5:
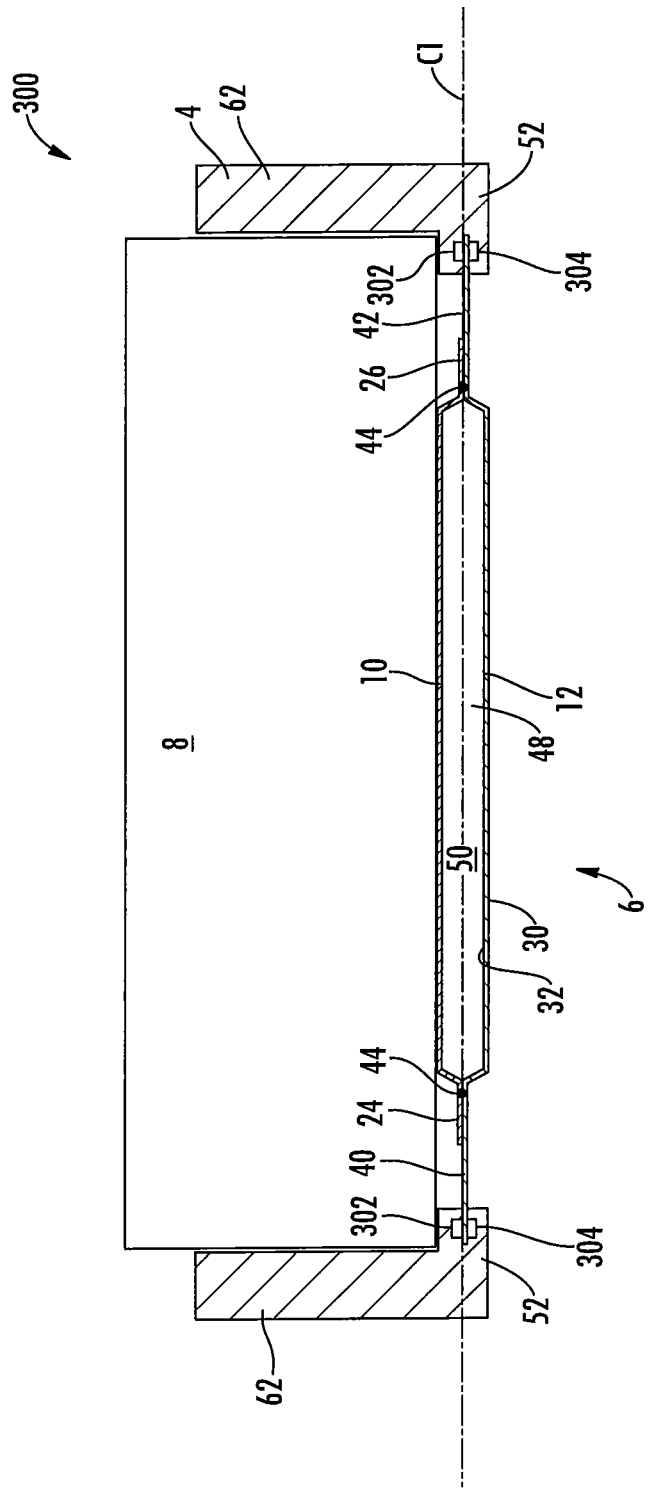
FIG. 5 is a schematic cross-sectional side-view of the housing assembly illustrated in FIGS. 1-4 according to another embodiment of the disclosure.

FIG. 5 is a schematic cross-sectional side-view of a housing assembly 300 according to another embodiment of the disclosure. The housing assembly 300 illustrated in FIG. 5 is the same as the housing assemblies 2 and 200 illustrated in FIGS. 1-4, except where specifically noted below. In accordance with the embodiment illustrated in FIG. 5 of the disclosure and as a non-limiting example, the housing assembly 300 does not include the use of the one or more thermal expansion and contraction compensating members 202 described and illustrated in relation to FIG. 4 of the disclosure.

As illustrated in FIG. 5 of the disclosure and as a non-limiting example, the housing assembly includes the use of one or more first thermal expansion and contraction compensating members 302 and one or more second thermal expansion and contraction compensating members 304. The one or more first and second thermal expansion and contraction compensating members 302 and 304 act as a mechanical isolator allowing a pre-determined amount of thermal expansion and contraction of the first and second plate members 10 and 12 relative to the tray portion 4 without resulting in a failure and/or creating one or more fractures within the structure of the housing assembly 300. This provides a more robust housing assembly 300 which in turn aids in improving the overall life and durability of the housing assembly 300. It is within the scope of this disclosure and as a non-limiting example that the one or more first and second thermal expansion and contraction compensating members 302 and 304 may be composed of a rubber composition, a polymeric composition, an elastomeric composition and/or a composite material.

At least a portion of the one or more first thermal expansion and contraction compensating members 302 of the housing assembly 300 are connected to at least a portion of the outer surface 32 of the one or more first and second flanges 40 and 42 of the second plate member 12. It is within the scope of this disclosure and as a non-limiting example that the one or more first thermal expansion and contraction compensating members 302 may be disposed at or near the axially outermost end of the one or more first and second flanges 40 and 42 of the second plate member 12. As a non-limiting example, the one or more first thermal expansion and contraction compensating members 302 may be a single continuous member or a plurality of thermal compensating members disposed along the axially outermost end of the one or more first and second flanges 40 and 42 of the second plate 12 of the heat transfer portion 6 of the housing assembly 300.

As best seen in FIG. 5 of the disclosure and as a non-limiting example, at least a portion of the one or more second thermal expansion and contraction compensating members 304 of the housing assembly 300 are connected to at least a portion of the inner surface 30 of the one or more first and second flanges 40 and 42 of the second plate member 12. It is within the scope of this disclosure and as a non-limiting example that the one or more second thermal expansion and contraction compensating members 304 may be disposed at or near the axially outermost end of the one or more first and second flanges 40 and 42 of the second plate member 12. As a non-limiting example, the one or more second thermal expansion and contraction compensating members 304 may be a single continuous member or a plurality of thermal compensating members disposed along the axially outermost end of the one or more first and second flanges 40 and 42 of the second plate 12.

According to an embodiment of the disclosure and as a non-limiting example the one or more first and second thermal expansion and contraction compensating members 302 and 304 may be integrally formed as part of the inner and outer surfaces 30 and 32 of the one or more first and second flanges 40 and 42 of the second plate member 12. As a result, it is to be understood that the one or more first and second thermal expansion and contraction compensating members 302 and 304 may be vulcanized, adhered using one or more adhesives or epoxies or chemically welded to the inner and outer surfaces 30 and 32 of the one or more first and second flanges 40 and 42 of the second plate member 12. In accordance with an alternative embodiment of the disclosure and as a non-limiting example, the one or more first and second thermal expansion and contraction compensating members 302 and 304 be received and/or retained within one or more grooves (not shown) in the inner and outer surfaces 30 and 32 of the one or more first and second flanges 40 and 42 of the second plate member 12.

In order to assemble the housing assembly 300, the one or more first and second thermal expansion and contraction compensating members 302 and 304 are attached to the inner and outer surfaces 30 and 32 of the one or more first and second flanges 40 and 42 of the second plate member 12 prior to inserting the heat transfer portion 6 into the mould assembly 63. Once the heat transfer portion 6 and the one or more first and second thermal expansion and contraction compensating members 302 and 304 have been secured within the moulding assembly 63, an amount of moulding material will be flown into the moulding assembly 63 thereby forming the tray portion 4 of the housing assembly 300 around the one or more first and second thermal expansion and contraction compensating members 302 and 304 and the one or more first and second flanges 40 and 42 of the second plate member 12. It is therefore to be understood that the one or more first and second thermal expansion and contraction compensating members 302 and 304 and the one or more first and second flanges 40 and 42 of the second plate member 12 may be moulded within the tray portion 4 as part of an overmoulding process.

Figure 6:
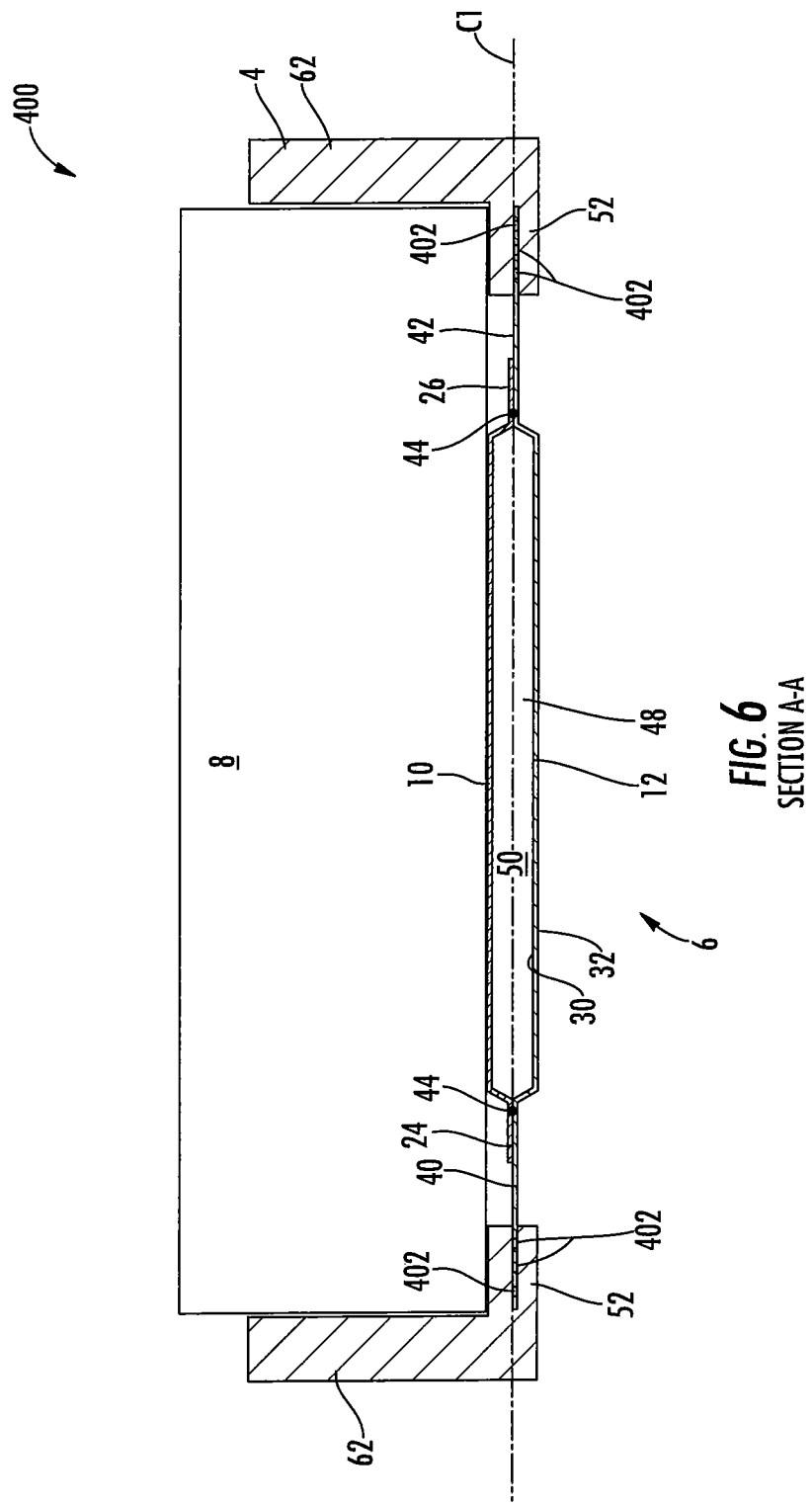
FIG. 6 is a schematic cross-sectional side-view of the housing assembly illustrated in FIGS. 1-5 according to yet another embodiment of the disclosure.

FIG. 6 is a schematic cross-sectional side-view of a housing assembly 400 according to yet another embodiment of the disclosure. The housing assembly 400 illustrated in FIG. 6 of the disclosure is the same as the housing assemblies 2, 200 and 300 illustrated in FIGS. 1-5, except where specifically noted below. In accordance with the embodiment illustrated in FIG. 6 of the disclosure and as a non-limiting example, the housing assembly 400 does not include the use of the one or more thermal expansion and contraction compensating members 202 or the one or more first and second thermal expansion and contraction compensating members 302 and 304.

As illustrated in FIG. 6 of the disclosure and as a non-limiting example, the one or more first and second flanges 40 and 42 of the second plate member 12 may include one or more apertures 402 extending from the inner surface 30 to the outer surface 32 of the one or more first and second flanges 40 and 42. The one or more apertures 402 of the second plate member 12 aid in providing a more robust and secure mechanical connection between the one or more first and second flanges 40 and 42 of the second plate member 12 and the tray portion 4 of the housing assembly 400. It is within the scope of this disclosure and as a non-limiting example that the one or more apertures 402 of the second plate member 12 may be disposed along the outer periphery of the one or more first and/or second plate members 10 and 12 of the heat transfer portion 12. As a non-limiting example, the one or more aperture 402 in the one or more first and second flanges 40 and 42 of the second plate member 12 are disposed outward from the one or more first and second flanges 24 and 26 of the first plate member 10 and the one or more first and second mould clamping members 86 and 100 of the first and second moulds 64 and 66.

In order to assemble the housing assembly 400, the one or more apertures are formed into the one or more first and/or second flanges 40 and/or 42 of the second plate member 12 prior to inserting the heat transfer portion 6 into the moulding assembly 63. Once the heat transfer portion 6 has been secured within the moulding assembly 63, an amount of moulding material will be flown into the moulding assembly 63 and into the one or more apertures 402 of the first plate member 12 thereby forming the tray portion 4 of the housing assembly 400. It is therefore to be understood that the one or more first and second flanges 40 and 42 of the second plate member 12 may be moulded within the tray portion 4 as part of an overmoulding process.

Figure 7:
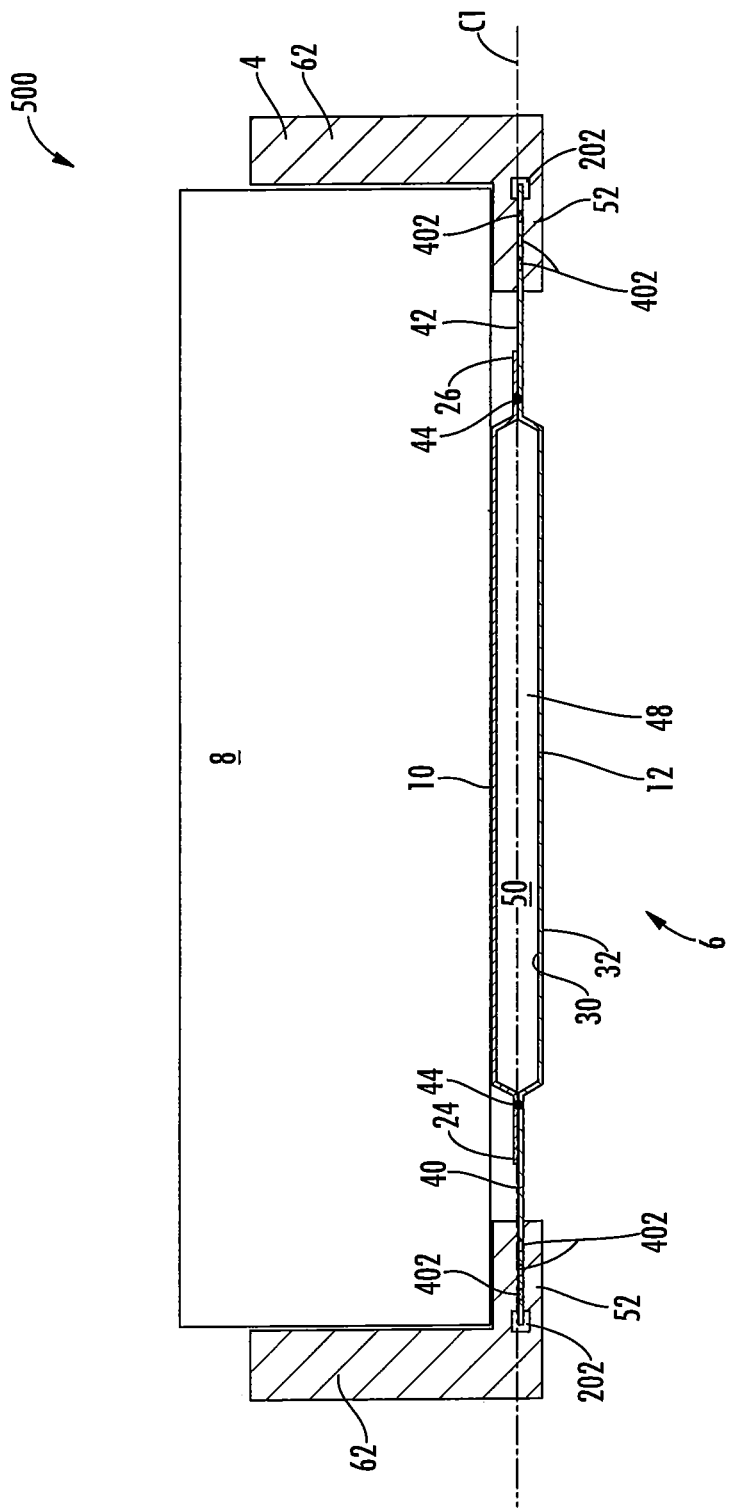
FIG. 7 is a schematic cross-sectional side-view of the housing assembly illustrated in FIGS. 1-6 according to still yet another embodiment of the disclosure.

FIG. 7 is a schematic cross-sectional side-view of a housing assembly 500 according to still yet another embodiment of the disclosure. The housing assembly 500 illustrated in FIG. 7 is the same as the housing assemblies 2, 200, 300 and 400 illustrated in FIGS. 1-6, except where specifically noted below. As illustrated in FIG. 7 of the disclosure and as a non-limiting example, the heat transfer portion 6 of the housing assembly 500 includes the one or more apertures 402 and the one or more thermal expansion and contraction compensating members 202 previously described herein. In accordance with the embodiment illustrated in FIG. 7 and as a non-limiting example, the one or more thermal expansion and contraction compensating members 202 are disposed axially outboard from and are directly adjacent to at least a portion of the one or more apertures 402 in the second plate member 12 of the heat transfer portion 6. It is therefore to be understood that the one or more apertures 402 of the housing assembly 500 provide a more secure mechanical connection between the heat transfer portion 6 and the tray portion 4 of the housing assembly 500. Additionally, it is to be understood that the one or more thermal expansion and contraction compensating members 202 act as a mechanical isolator allowing a pre-determined amount of thermal expansion and contraction of the first and second plate members 10 and 12 relative to the tray portion 4 without resulting in a failure and/or creating one or more fractures within the structure of the housing assembly 500. As a result, this provides a more robust housing assembly 500 which in turn aids in improving the overall life and durability of the housing assembly 500.

Figure 8:
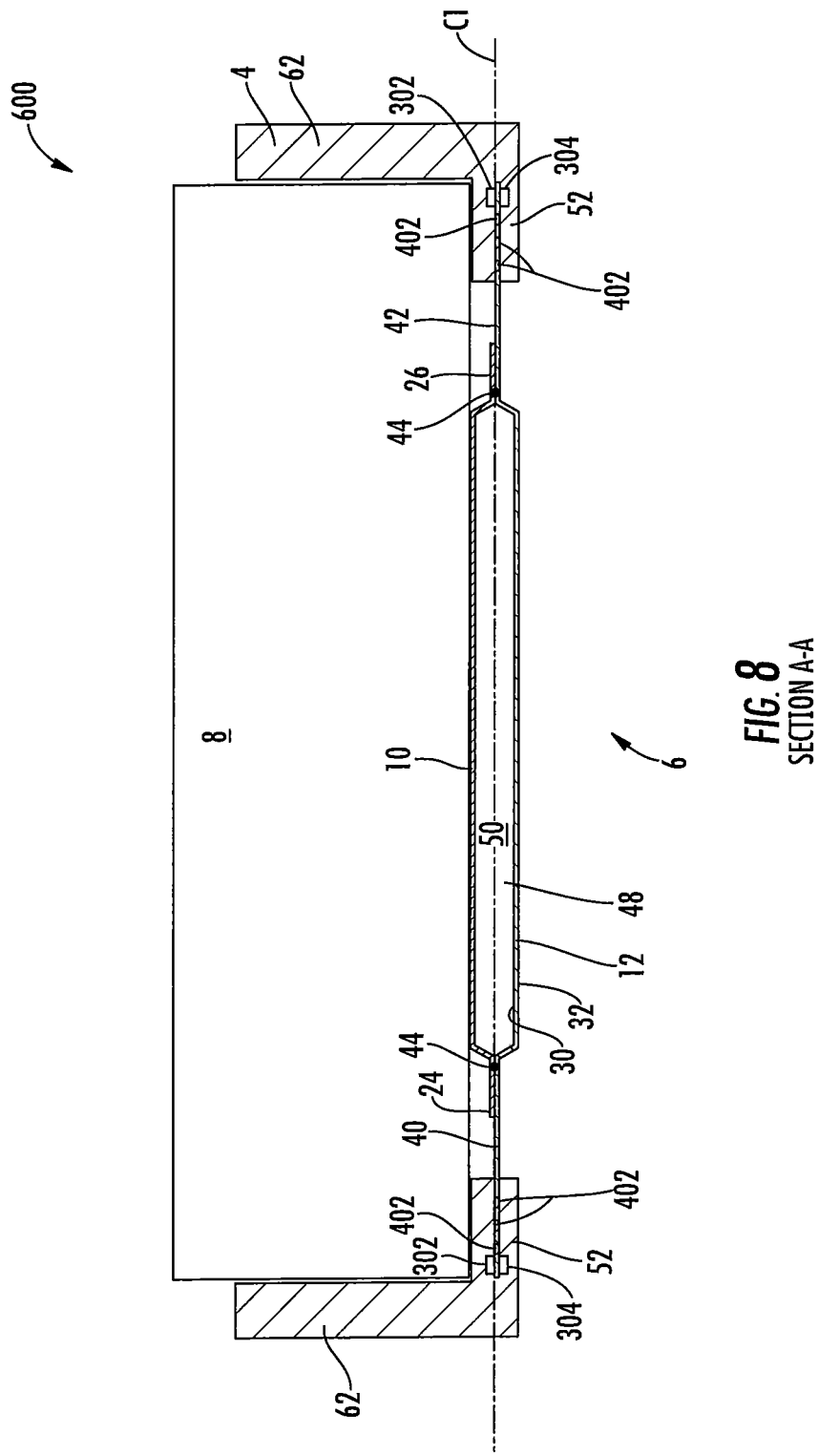
FIG. 8 is a schematic cross-sectional side-view of the housing assembly illustrated in FIGS. 1-7 according to still yet a further embodiment of the disclosure.

FIG. 8 is a schematic cross-sectional side-view of a housing assembly 600 according to still yet a further embodiment of the disclosure. The housing assembly 600 illustrated in FIG. 8 is the same as the housing assemblies 2, 200, 300, 400 and 500, except where specifically noted below. As illustrated in FIG. 8 of the disclosure and as a non-limiting example, the heat transfer portion 6 of the housing assembly 600 includes the one or more apertures 402, the one or more first thermal expansion and contraction compensating members 302 and the one or more second thermal expansion and contraction compensating members 304 previously described herein. In accordance with the embodiment illustrated in FIG. 8 and as a non-limiting example, the one or more first and second thermal expansion and contraction compensating members 302 and 304 are disposed axially outboard from and are directly adjacent to at least a portion of the one or more apertures 402 in the second plate member 12 of the heat transfer portion 6. It is therefore to be understood that the one or more apertures 402 of the housing assembly 600 provide a more secure mechanical connection between the heat transfer portion 6 and the tray portion 4 of the housing assembly 600. Additionally, it is to be understood that the one or more first and second thermal expansion and contraction compensating members 302 and 304 act as a mechanical isolator allowing a pre-determined amount of thermal expansion and contraction of the first and second plate members 10 and 12 relative to the tray portion 4 without resulting in a failure and/or creating one or more fractures within the structure of the housing assembly 600. As a result, this provides a more robust housing assembly 600 which in turn aids in improving the overall life and durability of the housing assembly 600.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A housing assembly, comprising:
   a tray portion;
   a heat transfer portion comprising a first plate member and a second plate member;
   wherein said first plate member has an inner surface, an outer surface, a first end portion a second end portion and an intermediate portion interposed between said first and second end portions of said first plate member;
   wherein said first end portion of said first plate member has one or more first flanges having a length L1 and said second end portion of said second plate member has one or more second flanges having a length L2;
   wherein said second plate member has an inner surface, an outer surface, a first end portion, a second end portion and an intermediate portion interposed between said first and second end portions of said second plate member;
   wherein said first end portion of said second plate member has one or more first flanges having a length L3 and said second end portion of said second plate member has one or more second flanges having a length L4;
   wherein said length L1 and L2 of said one or more first and second flanges of said first plate member are smaller than said lengths L3 and L4 of said one or more first and second flanges of said second plate member;
   wherein at least a portion of said one or more first and second flanges of said first plate member are integrally connected to at least a portion of said one or more first and second flanges of said second plate member; and
   wherein at least a portion of said one or more first and second flanges of said second plate member are overmoulded within at least a portion of said tray portion.

2. The housing assembly of claim 1, wherein said first plate member further comprises an outwardly extending portion and said second plate member further comprises an outwardly extending portion;
   wherein said outwardly extending portion of said first plate member extends from at least a portion of said intermediate portion of said first plate member away from said first plate member;
   wherein said outwardly extending portion of said second plate member extends from at least a portion of said intermediate portion of said second plate member away from said second plate member; and
   wherein said outwardly extending portion of said first plate member is aligned with said outwardly extending portion of said second plate member defining one or more fluid passages.

3. The housing assembly of claim 2, wherein said outwardly extending portion of said first plate member has a height $\beta$;
   wherein a portion of said one or more first flanges of said second plate member have one or more first clamping regions having a length L5 and said one or more second flanges of said second plate member have one or more second clamping regions having a length L6;
   wherein $L5 \geq \frac{1}{2}\beta$; and
   wherein $L6 \geq \frac{1}{2}\beta$.

4. The housing assembly of claim 2, wherein said outwardly extending portion of said first plate member has a height $\beta$;
   wherein said one or more first flanges of said second plate member have a length L7 extending from an axially outermost end of said one or more first flanges of said first plate member to an axially outermost end of said one or more first flanges of said second plate member;
   wherein said one or more second flanges of said second plate member have a length L8 extending from an axially outermost end of said one or more second flanges of said first plate member to an axially outermost end of said one or more second flanges of said second plate member;
   wherein $L7 \leq 10 \times \beta$; and
   wherein $L8 \leq 10 \times \beta$.

5. The housing assembly of claim 1, wherein said tray portion of said housing assembly comprises one or more axially extending portions and one or more radially extending portions; and
   wherein at least a portion of said one or more first and/or second flanges of said second plate member are overmoulded within at least a portion of said one or more axially extending portions of said tray portion of said housing assembly.

6. The housing assembly of claim 1, further comprising one or more electro-chemical cells; and
   wherein said one or more electro-chemical cells are received and/or retained within at least a portion of said tray portion of said housing assembly.

7. The housing assembly of claim 6, wherein said one or more electro-chemical cells are one or more battery cells, one or more rechargeable battery cells, one or more lithium-ion battery cells.

8. The housing assembly of claim 1, further comprising one or more thermal expansion and contraction compensating members;
   wherein said one or more thermal expansion and contraction compensating members extend along at least a portion of said inner surface and said outer surface of an axially outermost end of said one or more first and second flanges of said second plate member;

wherein at least a portion of said one or more thermal expansion and contraction compensating members are overmoulded within at least a portion of said tray portion of said housing assembly; and wherein said one or more thermal expansion and contraction compensating members allow for a pre-determined amount of thermal expansion and contraction between said one or more first and second plate members of said heat transfer portion and said tray portion of said housing assembly.

9. The housing assembly of claim 8, wherein said one or more thermal expansion and contraction compensating members are composed of a rubber composition, a polymeric composition, an elastomeric composition and/or a composite material.

10. The housing assembly of claim 1, further comprising one or more first thermal expansion and contraction compensating members and one or more second thermal expansion and contraction compensating members;

wherein at least a portion of said one or more first thermal expansion and contraction compensating members are integrally connected to at least a portion of said outer surface of said one or more first and second flanges of said second plate member;

wherein at least a portion of said one or more second thermal expansion and contraction compensating members are integrally connected to at least a portion of said inner surface of said one or more first and second flanges of said second plate member;

wherein at least a portion of said one or more first and second thermal expansion and contraction compensating members are overmoulded within at least a portion of said tray portion of said housing assembly; and wherein said one or more first and second thermal expansion and contraction compensating members allow for a pre-determined amount of thermal expansion and contraction between said one or more first and second plate members of said heat transfer portion and said tray portion of said housing assembly.

11. The housing assembly of claim 10, wherein said one or more first and second thermal expansion and contraction compensating members are composed of a rubber composition, a polymeric composition, an elastomeric composition and/or a composite material.

12. The housing assembly of claim 1, further comprising one or more apertures;

wherein said one or more apertures extend from an inner surface to an outer surface of said one or more first and second flanges of said second plate member; and wherein at least a portion of said tray portion is overmoulded over at least a portion of said one or more apertures within said one or more first and second flanges of said second plate member.

13. The housing assembly of claim 1, wherein said tray portion is made a composite vinyl ester, an injection moulded Nylon, a glass filled Nylon composite, a glass filled sheet moulding compound or a continuous fibre sheet material.

\* \* \* \* \*